US008675656B2

(12) United States Patent
Guichard et al.

(10) Patent No.: US 8,675,656 B2
(45) Date of Patent: Mar. 18, 2014

(54) SCALING VIRTUAL PRIVATE NETWORKS USING SERVICE INSERTION ARCHITECTURE

(75) Inventors: Jim Guichard, Groton, MA (US); Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 1082 days.

(21) Appl. No.: 11/676,800

(22) Filed: Feb. 20, 2007

(65) Prior Publication Data
US 2008/0198849 A1 Aug. 21, 2008

(51) Int. Cl.
*H04L 12/28* (2006.01)

(52) U.S. Cl.
USPC . 370/392; 370/389; 370/395.31; 370/395.53; 370/401; 370/409; 709/230; 709/238; 726/4

(58) Field of Classification Search
None
See application file for complete search history.

(56) References Cited

U.S. PATENT DOCUMENTS

| | | | |
|---|---|---|---|
| 6,463,061 B1 | 10/2002 | Rekhter et al. | |
| 6,526,056 B1 | 2/2003 | Rekhter et al. | |
| 6,560,644 B1 | 5/2003 | Lautmann et al. | |
| 6,680,942 B2 | 1/2004 | Mead et al. | |
| 6,684,331 B1 | 1/2004 | Srivastava | |
| 6,970,902 B1 | 11/2005 | Moon | |
| 7,099,947 B1 | 8/2006 | Nadeau et al. | |
| 7,200,114 B1* | 4/2007 | Tse-Au | 370/231 |
| 2004/0223498 A1* | 11/2004 | Sanderson et al. | 370/395.52 |
| 2005/0044237 A1 | 2/2005 | Sitaraman et al. | |
| 2006/0013209 A1 | 1/2006 | Somasundaram | |
| 2008/0080509 A1* | 4/2008 | Khanna et al. | 370/392 |
| 2008/0080517 A1* | 4/2008 | Roy et al. | 370/395.5 |

OTHER PUBLICATIONS

U.S. Appl. No. 11/655,363, entitled Service Insertion Architecture, by Quinn et al., on Jan. 19, 2006, 31 pgs.
Rosen, et al., Network Working Group Request for Comments 4364, entitled BGP/MPLS IP Virtual Private Networks (VPNS), IETF, Feb. 2006, pp. 1-44.
Rosen, et al., Network Working Group Request for Comments 2547, entitled BGP/MPLS VPNS, IETF, Mar. 1999, pp. 1-24.

* cited by examiner

*Primary Examiner* — Nicholas Sloms
(74) *Attorney, Agent, or Firm* — Novak Druce Connolly Bove + Quigg LLP (57) ABSTRACT

In one embodiment, service routers may register their serviced VPNs with a service directory/broker (SDB), and edge routers may register their attached VPNs. The SDB may then return service headers, each corresponding to a particular VPN, and also returns an address of a service router corresponding to each service header to the edge routers. An edge router may then push an appropriate service header onto a received packet, and forward the packet to the corresponding service router, which forwards the packet based on a maintained VRF for a VPN according to the service header (e.g., thus the edge routers need only maintain limited/reduced VRFs). Also, services provided by the service routers may be distinguished using service headers accordingly. In this manner, the edge routers may forward packets requiring one or more desired services to service routers configured to perform such services.

23 Claims, 4 Drawing Sheets

| CUSTOMER ROUTER ID 305 | VPN ID 310 | SERVICES 315 | SERVICE HEADER 320 | SERVICE ROUTER ADDRESS 325 |
|---|---|---|---|---|
| CE1 | VPN 1 | FIREWALL | SH 1 | P1 |
| CE1 | VPN 1 | NONE | SH 3 | P1 |
| CE2 | VPN 2 | FIREWALL | SH 8 | P2 |
| CE2 | VPN 2 | FIREWALL | SH 9 | P1 |
| ... | ... | ... | ... | ... |

TABLE 300

ENTRIES 330

SCALING VIRTUAL PRIVATE NETWORKS USING SERVICE INSERTION ARCHITECTURE

TECHNICAL FIELD

The present disclosure relates generally to computer networks, and, more particularly, to virtual private networks (VPNs) and the Service Insertion Architecture (SIA).

BACKGROUND

In many computer networks, the growth of virtual private networks (VPNs) and their widespread usage has accelerated greatly. In particular, more nodes are being interconnected through VPNs, e.g., more customers and corresponding customer edge devices (CEs) are interconnected with more provider edge devices (PEs, or "edge routers" generally), which may be interconnected with more provider devices (Ps, or "backbone/core routers"), etc., as will be understood by those skilled in the art. In addition, the number of services available to the larger number of nodes participating in VPNs has also increased. For example, certain "high touch" services, such as firewalls or other deep packet inspection services, may be available to a plurality of customer networks upon entrance to the service provider's network, e.g., at the PEs.

Ultimately, the combination of the increase in nodes and services in VPNs has created various issues with scalability. One such scaling concern is the amount of routing information ("state") maintained at the edge routers (PEs), as currently all of such information is kept at the edge routers. The larger number of customers (and CEs), VPNs, backbone/core routers (Ps), etc. results in a substantially large amount of routing information to maintain. Often, this large amount of routing information is burdensome for edge routers, especially where a majority of edge routers is only interconnected to a small number (e.g., one or two) of backbone routers. Moreover, each of the services available to the VPNs may also be computationally demanding (e.g., certain high touch services). For this reason, it may be a further burden to the edge routers to perform such services for the large number of attached customer networks (e.g., VPNs), particularly where other devices (e.g., more specialized routers) may be better-suited to perform such services, such as where those devices may have greater processing/computing power, larger memory, specialized functionality, etc., that is not available at the edge routers.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, service routers (e.g., "high-touch" service routers) may register one or more of their serviced virtual private networks (VPNs) with a service directory/broker (SDB), and edge routers may likewise register one or more of their attached VPNs. The SDB may send one or more service headers to the service routers and edge routers, each corresponding to a particular VPN of the respective routers. The SDB may also send an address of a service router corresponding to each service header to the edge routers. Upon receiving a packet for an attached VPN from a customer router, an edge router prepends ("pushes") an appropriate service header for the VPN onto the packet, and forwards the packet with the service header to the corresponding service router. The corresponding service router may receive the packet, and forward it based on a maintained virtual routing/forwarding table (VRF) for a VPN according to the service header. In this manner, the edge routers need not maintain fully populated VRFs for the VPNs.

Also, according to embodiments of the disclosure, registration and service headers may be used to distinguish between one or more services provided by the service routers accordingly. In this manner, the edge routers may forward packets requiring one or more desired services to service routers configured to perform such services.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SO-NET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

A virtual private network (VPN) is a collection of network nodes that establish private communications over a shared service network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN.

Network nodes belonging to the same VPN may be situated in different subnetworks, or "customer sites" (or "customer networks" interchangeably herein). Each customer site may participate in one or more different VPNs, although most often each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another.

The customer sites typically communicate with one another through a service provider network ("provider network"). The provider network is an AS that functions as a backbone network through which VPN information may be exchanged between customer sites. The provider network may include both provider edge devices (PEs) (or "edge routers" herein), which function as border routers at the logical outer edge of the provider network, as well as provider (P) devices situated within the interior ("core") of the provider network (e.g., "backbone routers" herein). Accordingly, each customer site contains at least one customer edge device (CE) (or "customer router" herein) coupled to a PE in the provider network. The customer site may be multi-homed to the provider network, i.e., wherein one or more of the customer's CEs is coupled to a plurality of PEs. The PE-CE data links may be established over various physical media, such as conventional wire links, optical links, wireless links, etc., and may communicate data formatted using various network communication protocols including ATM, Frame Relay, Ethernet, Fibre Distributed Data Interface (FDDI), etc.

Figure 1:
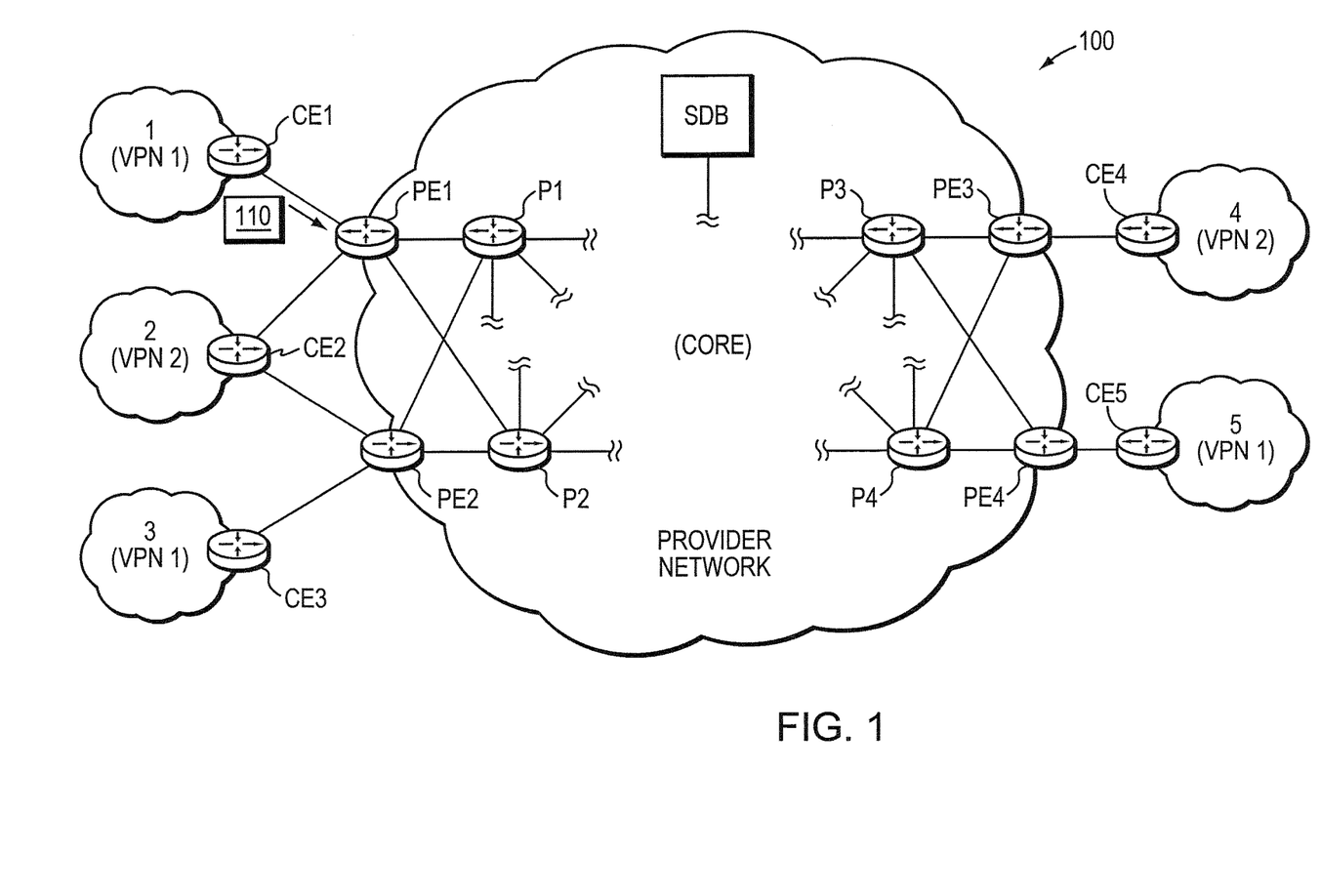
FIG. 1 illustrates an example computer network.

FIG. 1 is a schematic block diagram of an example computer network 100 illustratively comprising nodes/devices, such as in accordance with a VPN configuration described above. Illustratively, a provider network having shown provider devices (backbone routers) P1-P4, may be used to interconnect customer networks/sites 1-5 accordingly. For instance, provider edge routers PE1-PE4 may interconnect with CE1-CE5 as shown for customer networks 1-5 (e.g., having customer devices, such as sources and destinations, not shown). For example, customer networks 1, 3, and 5 may be associated with "VPN1", while customer networks 2 and 4 may be associated with "VPN2". Also, as described herein, a service directory/broker (SDB) node may be located within the provider network, which is generally addressable (reachable) by each node/device of the provider network.

For ease of illustration, the provider network is shown having illustrative nodes/devices, while interconnections between the nodes/devices are shown as illustrative links, the combination of which is generally associated with the term "core", as will be understood by those skilled in the art (e.g., to represent zero or more other backbone routers and/or associated links, etc.). Those skilled in the art will also understand that any number of nodes, devices, links, etc. may be used in the computer network, and that the view shown herein is for simplicity. Those skilled in the art will also understand that while the embodiments described herein relate to customer and provider networks and VPNs, they may also apply to any network configuration, such as within an Autonomous System (AS) or area, or throughout multiple ASes or areas, etc.

Data packets 110 may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

In a common VPN deployment, provider networks often provide the customer sites with layer-3 network-based VPN services that utilize IP and/or Multi-Protocol Label Switching (MPLS) technologies. These networks are typically said to provide "MPLS/VPN" services. This widely-deployed MPLS/VPN architecture is generally described in more detail in the IETF publication RFC 4364, entitled *BGP/MPLS IP Virtual Private Networks (VPNs)*, by E. Rosen et al., published February 2006, which is hereby incorporated by reference as though fully set forth herein.

Figure 2:
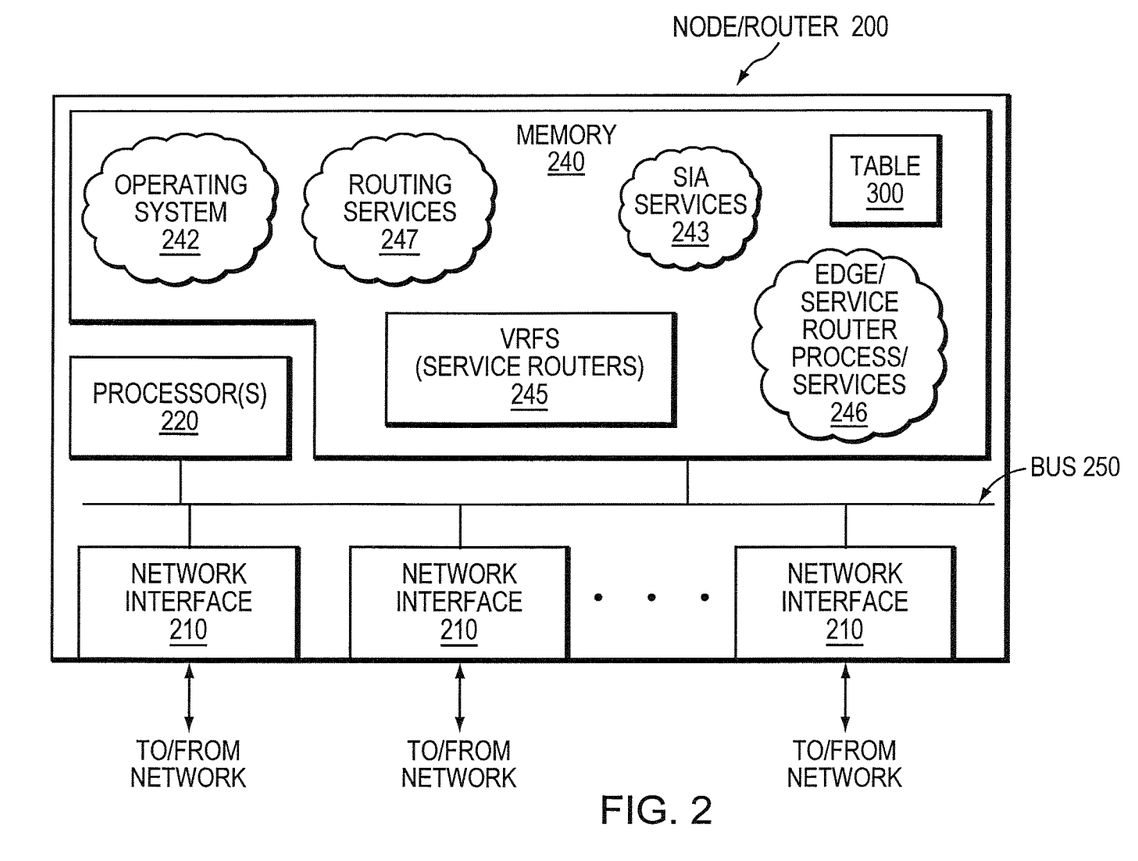
FIG. 2 illustrates an example network device/node.

FIG. 2 is a schematic block diagram of an example node/device 200 that may be advantageously used with one or more embodiments described herein, e.g., as edge and/or service routers (e.g., PEs and/or Ps), as described herein. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, known to those skilled in the art.

The memory 240 comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures, such as one or more tables 300. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 247, Service Insertion Architecture (SIA) services 243, and edge/service router process/services 244 to perform respective services for edge and service routers as described herein. It will be apparent to those skilled in the art that other processor and memory means, including various computer-readable media, may be used to store and execute program instructions pertaining to the inventive technique described herein.

Routing services 247 contain computer executable instructions executed by each processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage one or more routing/forwarding tables containing, e.g., data used to make routing and forwarding decisions. Notably, routing services 247 may also perform functions related to virtual routing protocols, such as maintaining virtual routing and forwarding (VRF) instances 245 as will be understood by those skilled in the art. In particular, VRFs 245 may contain VPN-based routes through the network 100, according to which traffic may be routed/forwarded based on an associated VPN. As described herein, according to embodiments of the disclosure, VRFs 245 may be advantageously maintained only on service routers, and a limited subset of routes on edge routers.

SIA services 243 contain computer executable instructions executed by each processor 220 to perform functions related to Service Insertion Architecture (SIA) protocols and techniques. In particular, the SIA is described in commonly-owned, copending U.S. patent application Ser. No. 11/655,363, entitled SERVICE INSERTION ARCHITECTURE, filed by Quinn et al., on Jan. 19, 2006, the contents of which are hereby incorporated by reference in its entirety. As described therein (e.g., and with enhancements/additions as described below), SIA provides a platform independent, consistent architecture for adding high touch services to a network without requiring topology changes. In particular, this architecture has several components. First, service nodes (SNs) and service clients (SCLs) "register" with a "service directory/broker" (SDB), which is any node/device within the network 100 configured to store and provide a consistent domain-wide view of available services. For instance, an SN may register with the SDB that it is able to provide firewall services for the network, while an SCL may register with the SDB that it desires firewall services. In response, the SDB returns a "service header" to each of the SN and SCL that is specific to the registered service. According to a second component of the architecture, traffic (packets) is redirected with a prepended service header from SCLs to an appropriate SN in the network, independent of physical location, such that the SN may perform the services as requested by the service header (e.g., firewalling). In this manner, SCLs need not perform the services desired/required by the traffic, but may instead redirect the traffic to SNs within the network that are specifically configured to provide such services. The traffic may then be forwarded from the SNs toward its destination after the services have been performed.

As noted above, an issue with scalability involving VPNs is the burdensome amount of routing information maintained at the edge routers (PEs). Also, each of the services available to the VPNs may be computationally demanding and further burdening to the edge routers to perform such services.

Scaling VPNs using SIA

According to embodiments of the disclosure, service routers (e.g., "high-touch" service routers) may register one or more of their serviced VPNs with an SDB, and edge routers may register one or more of their attached VPNs. The SDB may send one or more service headers to the service routers and edge routers, each corresponding to a particular VPN of the respective routers. The SDB may also send an address of a service router corresponding to each service header to the edge routers. Upon receiving a packet for an attached VPN from a customer router, an edge router prepends ("pushes") an appropriate service header for the VPN onto the packet, and forwards the packet with the service header to the corresponding service router. The corresponding service router may receive the packet, and forward it based on a maintained VRF for a VPN according to the service header. In this manner, the edge routers need not maintain fully populated VRFs for the VPNs.

Also, according to embodiments of the disclosure, registration and service headers may be used to distinguish between one or more services provided by the service routers accordingly. In this manner, the edge routers may forward packets requiring one or more desired services to service routers configured to perform such services (e.g., high-touch services).

In an illustrative embodiment, edge/service router process services 244 ("edge router process" and "service router process") contain computer executable instructions executed by each processor 220 to perform functions relating to novel techniques described herein to scale VPNs using SIA in a computer network. In particular, edge router process 244 executes in edge routers to perform various functions of the edge routers according to the novel techniques; whereas service router process 244 executes in service routers to perform various functions of the service routers according to the novel techniques. Illustratively, service routers are shown as backbone (P) routers, but the embodiments described herein are not so limited, and service routers may be any device reachable by the edge routers.

Operationally, the devices of the network 100 are configured to establish routing information, e.g., to set up routes and tables accordingly. For instance, the edge routers (e.g., PE1) may utilize conventional routing exchanges with locally attached customer devices (e.g., CE1 and CE2) to learn routes local to the corresponding customer networks (e.g., customer networks 1 and 2). In particular, the local routes from customer networks correspond to a VPN (e.g., a corresponding VPN identification, VPN-ID, e.g., "VPN1") represented by each customer router (or, specifically, each customer router interface), as will be understood by those skilled in the art.

Any locally learned routes for the customer networks may then be advertised from edge routers to correspondingly attached service routers (e.g., P1 and P2) using conventional mechanisms, e.g., VPNv4 routes over Multi-protocol (MP)-BGP sessions (e.g., as described in RFC 4364). (Note that a static route may be configured from the edge routers to the backbone/service routers.) In accordance with one or more embodiments described herein, however, the service routers may be configured not to send their routes to the edge devices, thus preventing the service routers from sending routes (e.g., at least VPN-related routes) to the edge routers. In other words, the MP-BGP sessions may be "uni-directional" sessions, where the edge routers send routing information to the service routers, but the service routers do not send routing information to the edge routers. Conversely, should the service routers send (VPN-related) routes to the edge routers, the edge routers may be configured to ignore the routes, and refuse to store the routing information.

In addition to receiving routes from the edge routers, the service routers (e.g., P1 and P2) may also exchange full routing information in a conventional manner with each other. Any routes learned by the service routers from the edge routers and/or service routers may then be imported (stored) into appropriate VRFs 245 at the service routers, for instance, through conventional importation means (e.g., Route-Target, RT import). Thus, each service router may be configured with VRFs supporting VPNs serviced by their attached edge routers (e.g., VRFs for VPN1 and VPN2 at P1).

Also in accordance with one or more embodiments described herein, the edge router process 244 of the edge routers and the service router process 244 of the service routers "register" with a service directory/broker (SDB) node within the network 100 that is configured to maintain a list of registered information, e.g., in accordance with the Service Insertion Architecture (SIA, as described in U.S. patent application Ser. No. 11/655,363 above). In particular, the service routers may register information with the SDB (using various exchange messages/protocols) pertaining to which VPNs are locally configured, e.g., by sending a list of VPN-IDs for which the service routers maintain a corresponding VRF, as mentioned above (e.g., VPN1 and VPN2 for P1). In addition, the edge routers may also register with the SDB information such as which VPNs are locally configured/attached, e.g., by sending a list of VPN-IDs for which the edge routers have received local routes (e.g., from customer routers).

The SDB may generally be pre-configured with a list of VPNs for which the provider network provides services (e.g., VPN1 and VPN2), and thus may have (or may generate) a service header (e.g., label) that corresponds to each particular VPN accordingly (e.g., "SH1" for VPN1). During registration by edge and service routers, the SDB may return corresponding labels to the registering routers (e.g., SH1 to devices registering VPN1). To edge devices in particular, the SDB may also return an address (e.g., an IP address) of a service router that corresponds to the service header (i.e., a service router that maintains a VRF for the VPN associated with the service header). Notably, in one or more embodiments, the edge routers may register VPNs first, and then, in response to receiving an address of a corresponding service router for that VPN (e.g., learning the services available at the service router), may exchange routing information with that service router, as described above.

The service headers for a particular VPN learned by the edge routers and service routers are generally the same service header, such that each type of router may be able to interpret the same service headers in the same manner (e.g., as described below). Further, an edge router may receive multiple service headers for a particular VPN from the SDB. For instance, where multiple service routers (e.g., P1 and P2) maintain VRFs 245 for the particular VPN (e.g., VPN1), the SDB may return multiple service headers (e.g., SH1 and SH4) to the edge router, each corresponding to a particular service router. Alternatively, the SDB may send the same service header (e.g., SH1) for each service router, but may include the multiple addresses of the service routers that correspond to the service header. For example, in one or more embodiments, the SDB may return a single service header corresponding to the VPN along with multiple service router addresses, and the receiving edge router may determine which service router of the multiple service routers is locally attached.

In addition to registering VPNs, the edge router process 244 of the edge routers and the service router process 244 of the service routers may further be configured to register services with the SDB. For instance, certain VPNs may desire (or require) certain services, such as deep packet inspection, intrusion detection, firewalling, other high touch services, etc. Accordingly, when registering the locally attached VPNs, an edge router may also register which services that VPN desires (if any). The SDB (which may be further configured to know what particular services may be requested/required by each particular VPN ahead of time) may thus return a service header not only specific to the VPN, but also specific to the desired service. Also, service routers may register which services they are configured to perform (e.g., specific to particular VPNs or generally for any VPN) with the SDB. In this manner, in accordance with the SIA, the edge routers may be considered as service clients (SCLs), while the service routers may be considered as service nodes (SNs).

Illustratively, assume that VPN1 is configured to require firewalling of all packets through the provider network. Thus, an edge router registering VPN1 (e.g., PE1) may also register the desired service (firewalling) with the SDB. Further assume that P1 and P2 both register VPN1, but only P1 is configured to provide firewall services. In accordance with embodiments described herein, the service header returned from the SDB to the PE1 for VPN1 desiring firewalling corresponds to P1 accordingly. That is, while P2 may be configured with a VRF for VPN1, firewalling may not be a service provided by P2, thus traffic from PE1 should be forwarded to P1 instead.

Those skilled in the art will appreciate that while VPNs are generally configured to desire/require the same services for all traffic, there may be circumstances where some traffic desires certain services while other traffic desires other services (or none at all). As such, it may be beneficial for the SDB to return service headers and addresses corresponding to any possible combination of services and/or service routers. For instance, from the example above, the SDB may return a first service header (e.g., SH1) for firewalling of VPN1 at P1, and a second service header (e.g., SH5) for non-firewalling of VPN1 at P2. Also, in accordance with one or more embodiments described herein, multiple service headers for the same VPN may be provided by the SDB for a single service router. For example, if P1 offers firewalling and another deep packet inspection service for VPN1, a second service header (e.g., SH2) may correspond to the deep packet inspection services at P1. Also, a service header for traffic not requiring any services (e.g., SH3) may also be provided for VPN1 traffic that is destined to P1 that does not require any services to be performed. In other words, the service headers as described herein relate not only to VPNs, but also to particular services to be performed on traffic of those VPNs.

Figure 3:
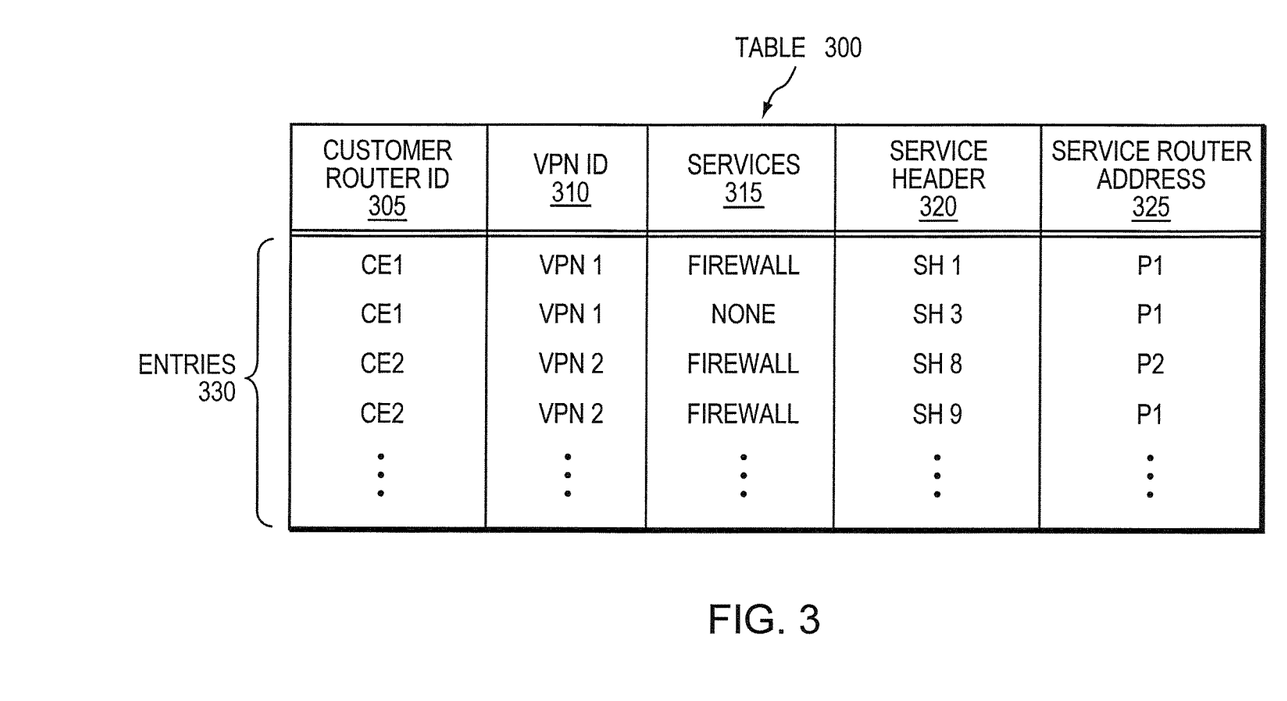
FIG. 3 illustrates an example table.

FIG. 3 illustrates an example table 300 that may be used in accordance with one or more embodiments described herein. Table 300 is illustratively stored in memory 240 and includes one or more entries 330, each comprising a plurality of fields for storing a customer router ID 305, a VPN-ID 310, desired/required services 315, a service header 320, and a service router address 325. The table 300 is illustratively maintained and managed by SIA services 243. To that end, the SIA services 243 maintain the table (or list, etc.) according to information provided by the SDB.

For example, assume that the table 300 is maintained by an edge router, e.g., PE1. Accordingly, as described above PE1 may register VPN1 for locally attached customer network 1 (for CE1) for both firewalled and non-firewalled traffic. In return, the SDB may provide service headers corresponding to whichever service routers in the provider network that maintain VRFs for VPN1. Illustratively, if only P1 may forward VPN1 traffic and is configured to provide firewall services, then the SDB returns service headers for firewalled traffic (e.g., SH1) and non-firewalled traffic (e.g., SH3), along with the corresponding address for P1. PE1 may also register VPN2 for locally attached customer network 2 (for CE2), whose traffic all requires firewalling. Assuming P1 and P2 both provide forwarding and firewalling for VPN2, the SDB may return service headers 320 for both P1 and P2 (e.g., SH9 and SH8, respectively). Notably, a similar table 300 may be maintained by the SDB and/or service routers, possibly with modified field entries. For example, the SDB and service routers may not require a customer router ID field 305, and the service routers may also not require a service router address field 325. The table 300 as shown is meant to be illustrative, and those skilled in the art will understand that other means for storing the information at the nodes/devices may be used in accordance with one or more embodiments described herein.

Once the routing information is established and VPNs and/or services registered as described above, the edge router process 244 of the edge router (e.g., PE1) may receive traffic (e.g., a packet 110) from a locally attached customer router (e.g., CE1). The edge router may first determine whether the destination address is a locally attached (i.e., known) customer network address. For example, though not shown, PE1 may be further interconnected to another customer network that belongs to VPN1. As such, the edge router PE1 may be able to forward the traffic to the destination without entering the provider network core (i.e., it has a locally configured address for the destination). If, on the other hand, the traffic is headed to a remote destination (i.e., an address unknown to the edge router, e.g., from customer network 5), the edge router determines the appropriate VPN-ID 310 corresponding to the customer router (e.g., the address/ID of the customer router 305) from which the traffic was received. The edge router may also determine whether any particular services are required/desired for the traffic (e.g., services for all VPN traffic, or more specifically delineated service requirements, such as particular services for types of traffic, for example, voice traffic). By performing a look-up operation into the table 300, the edge router process 244 of the edge router may determine an appropriate service header 320 based on the VPN-ID 310 and services 315, and pushes (prepends) the VPN-specific service header (e.g., SH1) onto the packet 110, and forwards the packet to the corresponding service router P1 (field 325).

The service router process of the corresponding service router (e.g., P1) may receive the packet 110, and performs a look-up operation into its table 300 based on the service header prepended by the edge router. If any services are desired/required by the service header (e.g., firewalling), the service router may perform those services accordingly. (Notably, according to SIA, the service router may "chain" services, where in the event multiple services are required, the service router may perform a first service, then forward the packet to another service node to perform a second service, and so on.) After completing any necessary services to the packet 110, the service router may then remove (pop) the service header from the packet, and forward the packet to its destination through the provider network core in a conventional manner, i.e., based on the VRF 245 maintained for the VPN as indicated by the service header of the packet. In this manner, the embodiments described herein allow for specialized service nodes (service routers) for different combinations of services (e.g., one service node might be for certain VPN customers with firewalls, others for other VPNs with other services, etc.).

Notably, there may be situations where an edge router (e.g., PE1) is interconnected with a plurality of service routers (e.g., P1 and P2) for a particular VPN, e.g., and that each perform a desired service (e.g., firewalling) for the VPN (e.g., VPN2), as mentioned above. Accordingly, upon receiving a packet 110, the edge router may determine that a plurality of appropriate service headers exists for a received packet, e.g., SH8 and SH9, and may thus select one of the plurality of appropriate service headers to push onto the packet. For instance, the selection may be random, or may be based on one or more factors, such as configuration, current state of the service routers (e.g., queue length, processing/memory availability, etc.), or a load balancing scheme to load balance the forwarding of packets between the plurality of corresponding service routers (e.g., 50% of flows with SH8 to P2 and 50% of flows with SH9 to P1).

Figure 4:
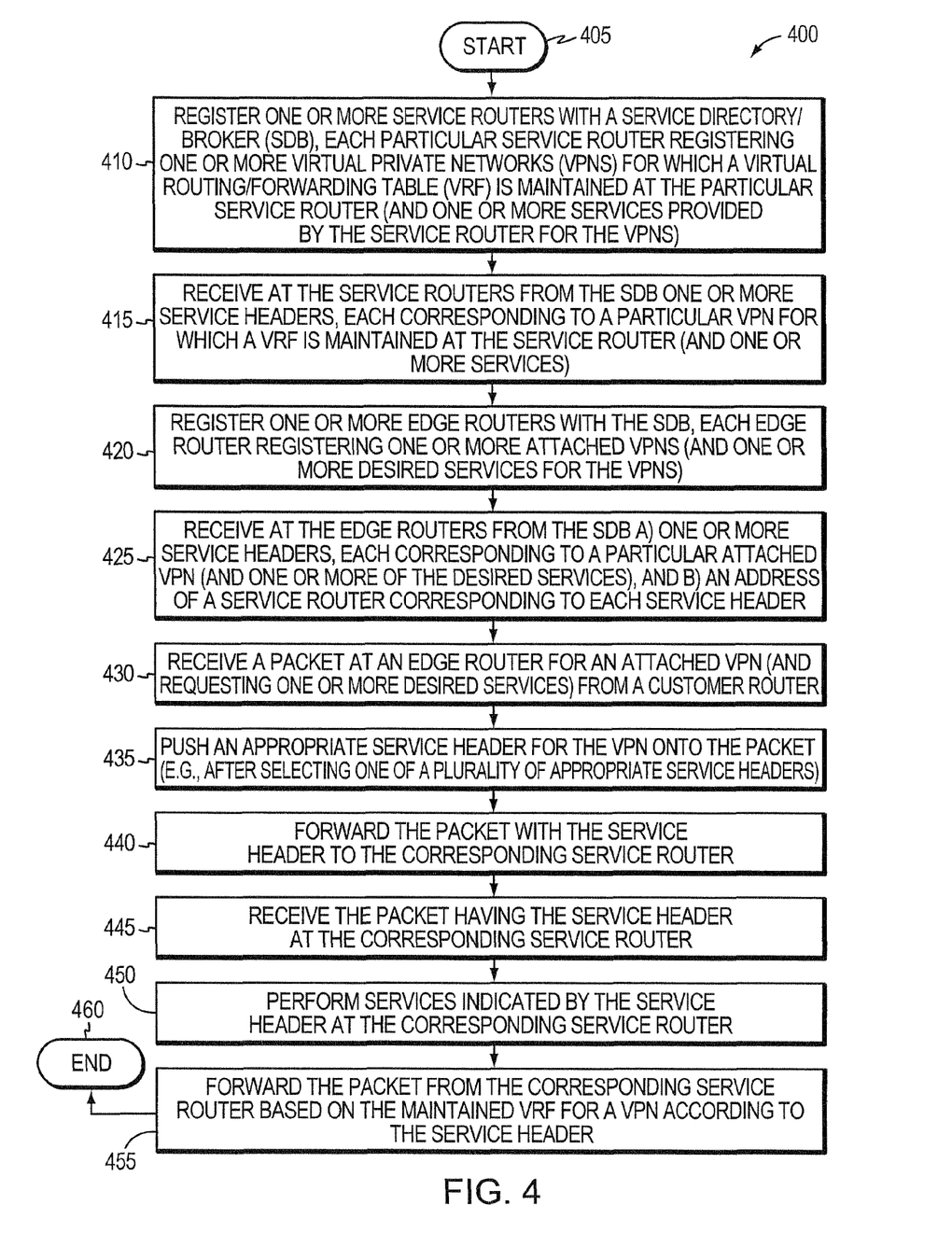
FIG. 4 illustrates an example procedure for scaling VPNs using SIA.

FIG. 4 illustrates an example procedure for scaling VPNs using SIA in accordance with one or more embodiments described herein. The procedure 400 starts at step 405, and continues to step 410, where one or more service routers (e.g., P1) register with an SDB, each particular service router registering one or more VPNs for which a VRF 245 is maintained at the particular service router. Also, as mentioned above, the service routers may further register one or more services provided by the service router for the VPNs, e.g., firewalling, etc. In step 415, the service routers receive one or more service headers sent from the SDB, each corresponding to a particular VPN for which a VRF is maintained at the service router (and also corresponding to one or more services, as mentioned above). For example, P1 may maintain a VRF for VPN1 and may provide firewalling services. Thus, P1 may receive service headers for VPN1 traffic that desires/requires firewalling (e.g., SH1), and, as mentioned above, possibly another service header (e.g., SH3) for VPN1 traffic for which firewalling is not to be performed.

Further, in step 420 one or more edge routers (e.g., PE1) register one or more attached VPNs with the SDB, optionally along with one or more desired services for the VPNs, as mentioned above. The edge routers may then receive from the SDB i) one or more service headers corresponding to a particular attached VPN (e.g., and one or more of the desired services), and ii) an address of a service router corresponding to each service header. For instance, PE1 may register VPN1 and VPN2, e.g., with their respective services. In response, the SDB may return the service headers that correspond to each VPN and associated service, along with the service router that will provide the forwarding and/or services (e.g., service header SH1 to service router P1 for firewalled traffic of VPN1).

Upon receiving a packet 110 at an edge router for an attached VPN (and requesting one or more desired services) from a customer router in step 430, the edge router may push an appropriate service header for the VPN onto the packet (e.g., after selecting one of a plurality of appropriate service headers, as mentioned above) in step 435. The edge router forwards the packet with the service header to the corresponding service router in step 440, which receives the packet in step 445. In step 450, the corresponding service router may perform the services indicated by the service header (if any services are so desired), and in step 450 forwards the packet based on the maintained VRF 245 for a VPN according to the service header (e.g., the VRF for VPN1 according to service header SH1). The procedure 400 then ends in step 460, notably with the option of further packets being received and processed according to steps 430-455. Moreover, each time an edge router or service router is added/deleted, or the information therein changes (e.g., routing information, VPNs, services, etc.), the appropriate steps above may be repeated, e.g., registration, etc. in a dynamic fashion Advantageously, the novel techniques described herein scale VPNs using SIA in a computer network. By registering VPNs and utilizing service headers, the novel techniques efficiently reduce routing state at edge routers (PEs) within VPN environments, e.g., removing fully populated VRFs at the edge routers (e.g., eliminating the need for large-scale VPN routing states at the edges). In particular, the techniques described above distribute/spread services across multiple routers (service routers) acting as specialized service nodes, regardless of the fact that a majority of customer routers are generally attached to a single edge router (or two for redundancy). Also, the dynamic aspects of one or more embodiments described herein alleviate the need for cumbersome and inefficient manual configuration, particularly as nodes, VPNs, and/or services are added/deleted to/from the computer network.

While there have been shown and described illustrative embodiments that scale VPNs using SIA in a computer network, it is to be understood that various other adaptations and modifications may be made within the spirit and scope of the present invention. For example, the embodiments have been shown and described herein for use with VPNs in accordance with RFC 4364 or RFC 2547. However, the embodiments of the invention in their broader sense are not so limited, and may, in fact, be used with any inter-domain applications with VPNs, with or without desired services. Also, while the above description specifically mentions the use of "Service Insertion Architecture" and illustratively provides an example of SIA in U.S. patent application Ser. No. 11/655,363, it is expressly contemplated that other techniques/mechanisms may be used to register services and VPNs with a centralized node (e.g., the SDB), and such techniques/mechanisms are within the scope of one or more embodiments described herein.

Further, while the above description describes "edge routers" and "service routers" as separate routers, there may be circumstances where a router is an edge router (connected to customer routers) and a service router (adapted to perform services, such as high-touch services, and/or maintain VRFs for its local routes and for local routes of other edge routers). Accordingly, the above description of completely separate routers is merely a representative example, and is not meant to be limiting to the scope of the present invention.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

What is claimed is:

1. A provider edge node located at a logical outer edge of a provider network, comprising:
   one or more network interfaces adapted to communicate with one or more customer routers of a customer network, one or more service routers located within an interior of the provider network remote from any logical outer edge of the provider network, and a service directory/broker (SDB);
   one or more processors coupled to the network interfaces and adapted to execute one or more processes; and
   a memory adapted to store an edge router process executable by each processor, the edge router process when executed operable to:
   i) maintain a virtual routing/forwarding table (VRF) having a limited sub set of routing information related to one or more attached virtual private networks (VPNs);
   ii) register with the SDB the one or more attached virtual private networks (VPNs);
   iii) receive from the SDB a) one or more service headers, each corresponding to a respective VPN, and b) an address of a service router, located within the interior of the provider network, remote from any logical outer edge of the provider network, corresponding to each service header, the service router configured to maintain a virtual routing/forwarding table (VRF) having a full set of routing information for the respective VPN;
   iv) receive a packet for a particular attached VPN from a customer router;
   iv) push a service header for the particular VPN, of the one or more service headers received from the SDB, onto the packet; and
   vi) forward the packet with the service header to a corresponding service router to thereby forward the packet based on the service router's maintained VRF according to the service header.

2. The provider edge node as in claim 1, wherein the edge router process is further operable to:
   i) register with the SDB the one or more attached VPNs and one or more desired services for the VPNs;
   ii) receive from the SDB a) one or more service headers, each corresponding to a respective VPN and one or more of the desired services, and b) an address of a service router, located within the interior of the provider network, corresponding to each service header, the service router configured to maintain a VRF for the respective VPN and to perform the one or more of the desired services;
   iii) receive a packet for a particular attached VPN requesting one or more desired services from a customer router;
   iv) push a service header for the particular VPN and the desired services of the one or more service headers received from the SDB onto the packet; and
   v) forward the packet with the service header to a corresponding service router to thereby forward the packet based on the service router's maintained VRF and to perform the desired services according to the service header.

3. The provider edge node as in claim 1, wherein the edge router process is further operable to:
   exchange routing information with the one or more customer routers.

4. The provider edge node as in claim 3, wherein the edge router process is further operable to:
   send the routing information to the one or more service routers located within the interior of the provider network.

5. The provider edge node as in claim 4, wherein the edge router process is further operable to:
   send the routing information to a particular service router in response to learning of services of the particular service router from the SDB.

6. The provider edge node as in claim 4, wherein the edge router process is further operable to:
   utilize a uni-directional multi-protocol Border Gateway Protocol (MP-BGP) session to send the routing information to the one or more service routers.

7. The provider edge node as in claim 1, wherein the edge router process is further operable to:
   refuse to store routing information received from the one or more service routers relating to VPNs.

8. The provider edge node as in claim 1, wherein the edge router process is further operable to:
   determine that a plurality of appropriate service headers exist for a received packet; and
   select one of the plurality of appropriate service headers to push onto the packet.

9. The provider edge node as in claim 8, wherein the edge router process is further operable to:
   select one of the plurality of appropriate service headers to load balance the forwarding of packets among a plurality of corresponding service routers.

10. A service node located within an interior of a provider network, remote from any logical outer edge of the provider network, comprising:
   one or more network interfaces adapted to communicate with one or more provider edge routers located at the logical outer edge of the provider network, and a service directory/broker (SDB);
   one or more processors coupled to the network interfaces and adapted to execute one or more processes; and
   a memory adapted to store one or more virtual routing/forwarding tables (VRFs) having a full set of routing information for one or more virtual private networks (VPNs) and a service router process executable by each processor, the service router process when executed operable to:
   i) register with the SDB the one or more VPNs for which a VRF is maintained;
   ii) receive from the SDB one or more service headers, each corresponding to a respective VPN;
   iii) receive a packet having a service header, from a provider edge router that maintains a VRF having a limited subset of routing information relating to at least some VPNs; and
   iv) forward the packet based on the maintained VRF for a particular VPN according to the service header.

11. The service node as in claim 10, wherein the service router process is further operable to:
   i) register with the SDB one or more VPNs for which a VRF is maintained and one or more services provided by the service node for the VPNs;
   ii) receive from the SDB one or more service headers, each corresponding to a respective VPN and one or more services;
   iii) receive a packet having a service header from a provider edge router; and
   iv) perform services indicated by the service header and forward the packet based on the maintained VRF for a particular VPN according to the service header.

12. The service node as in claim 10, wherein the service router process is further operable to:
   receive routing information from one or more provider edge routers and one or more other service nodes located in the interior of the provider network.

13. The service node as in claim 10, wherein the service router process is further operable to:
   prevent sending of routing information relating to VPNs to the one or more provider edge routers.

14. A method, comprising:
   registering one or more service routers located within an interior of a provider network, remote from any logical outer edge of the provider network, with a service directory/broker (SDB), each service router registering one or more virtual private networks (VPNs) for which a virtual routing/forwarding table (VRF) having a full set of routing information for the VPN is maintained at the service router;
   receiving at the service routers from the SDB one or more service headers, each corresponding to a VPN for which a VRF is maintained at the service router;
   registering one or more provider edge routers of the provider network with the SDB, each provider edge router registering one or more attached VPNs and maintaining a limited subset of routing information related to the one or more attached VPNs;
   receiving at the provider edge routers from the SDB a) one or more service headers, each corresponding to an attached VPN, and b) an address of a service router corresponding to each service header;
   receiving a packet at a provider edge router for a particular attached VPN from a customer router;
   pushing a service header for the particular VPN, of the one or more service headers received from the SDB, onto the packet;
   forwarding the packet with the service header to the corresponding service router;
   receiving the packet having the service header at the corresponding service router; and
   forwarding the packet from the corresponding service router based on the maintained VRF for the particular VPN according to the service header.

15. The method as in claim 14, further comprising:
   registering the one or more service routers located within the interior of the provider network with the SDB, each service router registering one or more VPNs and one or more services provided by the service router for the VPNs;
   receiving at the service routers from the SDB the one or more service headers, each corresponding to a VPN and one or more services;
   registering the one or more provider edge routers of the provider network with the SDB, each provider edge router registering one or more attached VPNs and one or more desired services for the VPNs;
   receiving at the provider edge routers from the SDB one or more service headers, each corresponding to an attached VPN and one or more of the desired services;
   receiving a packet at a provider edge router for a particular attached VPN and requesting one or more desired services from a customer router;
   pushing a service header for the particular VPN and desired services of the one or more service headers received from the SDB onto the packet;
   forwarding the packet with the service header to the corresponding service router;
   receiving the packet having the service header at the corresponding service router;
   performing services indicated by the service header at the corresponding service router; and
   forwarding the packet from the corresponding service router based on the maintained VRF for the particular VPN according to the service header.

16. The method as in claim 15, wherein the SDB is part of a service insertion architecture (SIA), the provider edge routers are service clients (SCLs), and the service routers are service nodes (SNs).

17. The method as in claim 15, wherein the services are selected from the group consisting of: deep packet inspection; intrusion detection; and firewalling.

18. The method as in claim 15, wherein the service headers received for a VPN and services at the provider edge router and service routers are the same.

19. The method as in claim 14, further comprising:
   determining at a provider edge router that a plurality of appropriate service headers exist for a received packet; and
   selecting one of the plurality of appropriate service headers to push onto the packet.

20. A node comprising:
means for maintaining a virtual routing/forwarding table (VRF) having a limited subset of routing information related to one or more attached virtual private networks (VPNs);
means for registering with a service directory/broker (SDB) the one or more attached VPNs;
means for receiving from the SDB a) one or more service headers, each service header corresponding to a respective VPN, and b) an address of a service router located within an interior of a provider network, remote from any logical outer edge of the provider network, the service router configured to maintain a virtual routing/forwarding table (VRF) having a full set of routing information related to at least one VPN;
means for receiving a packet for a particular VPN from a customer router;
means for pushing a service header for the particular VPN, of the one or more service headers received from the SDB, onto the packet; and
means for forwarding the packet with the service header to a corresponding service router that will forward the packet based on the service router's maintained VRF according to the service header.

21. A method comprising:
maintaining, at a provider edge router located at a logical outer edge of a provider network, a virtual routing/forwarding table (VRF) having a limited subset of routing information related to one or more attached virtual private networks (VPNs);
receiving, at the provider edge router, from a service directory/broker (SDB) one or more service headers, each service header corresponding to a respective VPN of the one or more VPNs, and an address of a service router corresponding to each service header, the service router being a provider router located within an interior of the provider network, remote from any logical outer edge of the provider network, and configured to maintain a VRF having a full set of routing information related to at least one VPN;
receiving a packet for a particular VPN from a customer router;
pushing a service header for the particular VPN of the one or more service headers received from the SDB onto the packet; and
forwarding, from the provider edge router, the packet with the service header to the corresponding service router that maintains the VRF for the particular VPN, the corresponding service router to forward the packet based on the service router's maintained VRF according to the service header.

22. The method as in claim 21, wherein each service header also corresponds to one or more of the desired services to be provided by the service router, and the forwarding forwards the packet with the service header to the corresponding service router that will also perform the one or more desired services according to the service header.

23. The method as in claim 21, further comprising:
exchanging routing information with one or more customer routers; and
sending the routing information to a particular service router, in response to learning of services provided by the particular service router.

* * * * *